F. C. B. PAGE.
METAL WORKING MACHINE.
APPLICATION FILED APR. 6, 1910.
1,026,825.
Patented May 21, 1912.
8 SHEETS—SHEET 1.
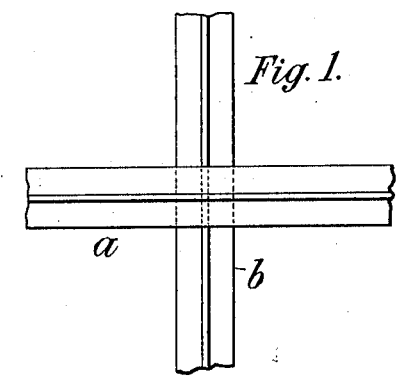
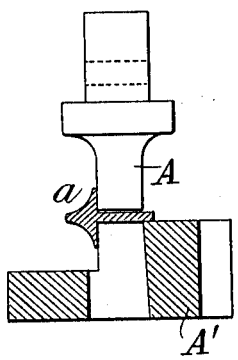
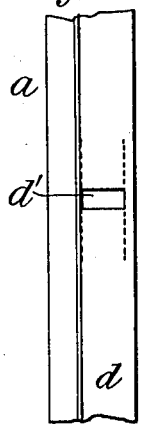
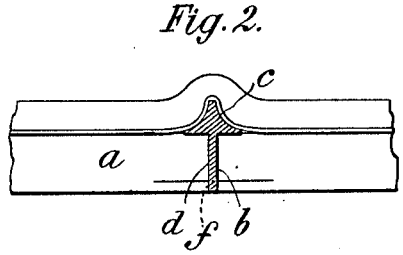
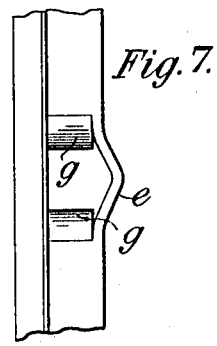
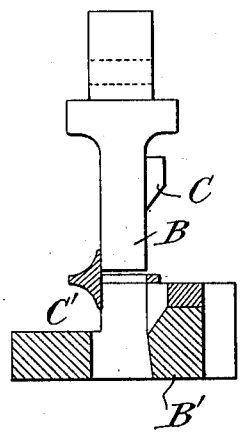
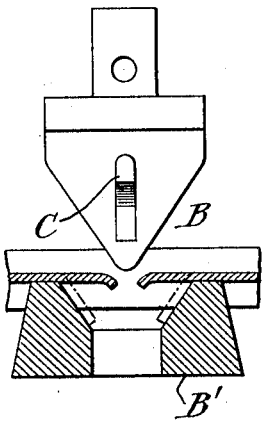
WITNESSES:
INVENTOR:
Frank C B. Page,
By Attorneys,

F. C. B. PAGE.
METAL WORKING MACHINE.
APPLICATION FILED APR. 6, 1910.

1,026,825.

Patented May 21, 1912.

8 SHEETS—SHEET 2.

WITNESSES:
Fred White
René Muine

INVENTOR :
Frank C. B. Page,
By Attorneys,

F. C. B. PAGE.
METAL WORKING MACHINE.
APPLICATION FILED APR. 6, 1910.
1,026,825.
Patented May 21, 1912.
8 SHEETS—SHEET 3.
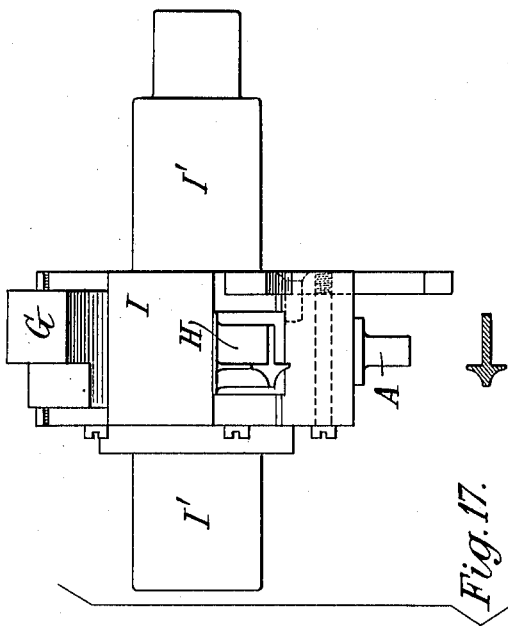
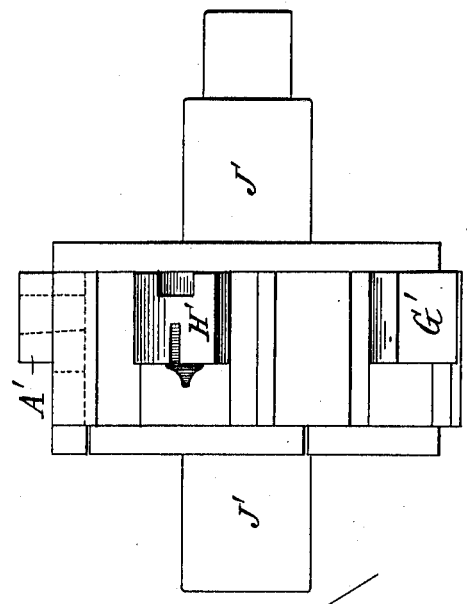
Fig. 17.
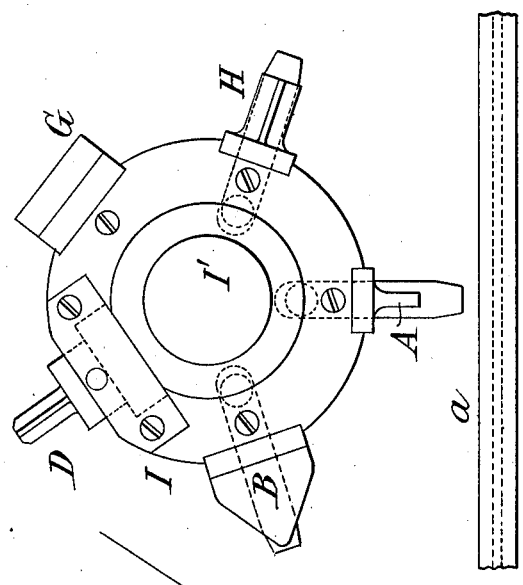
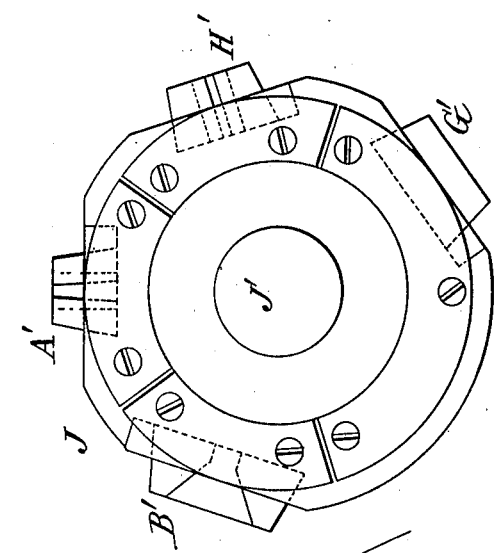
Fig. 16.
WITNESSES:
Fred. White
René Bruine
INVENTOR:
Frank C. B. Page,
By Attorneys,

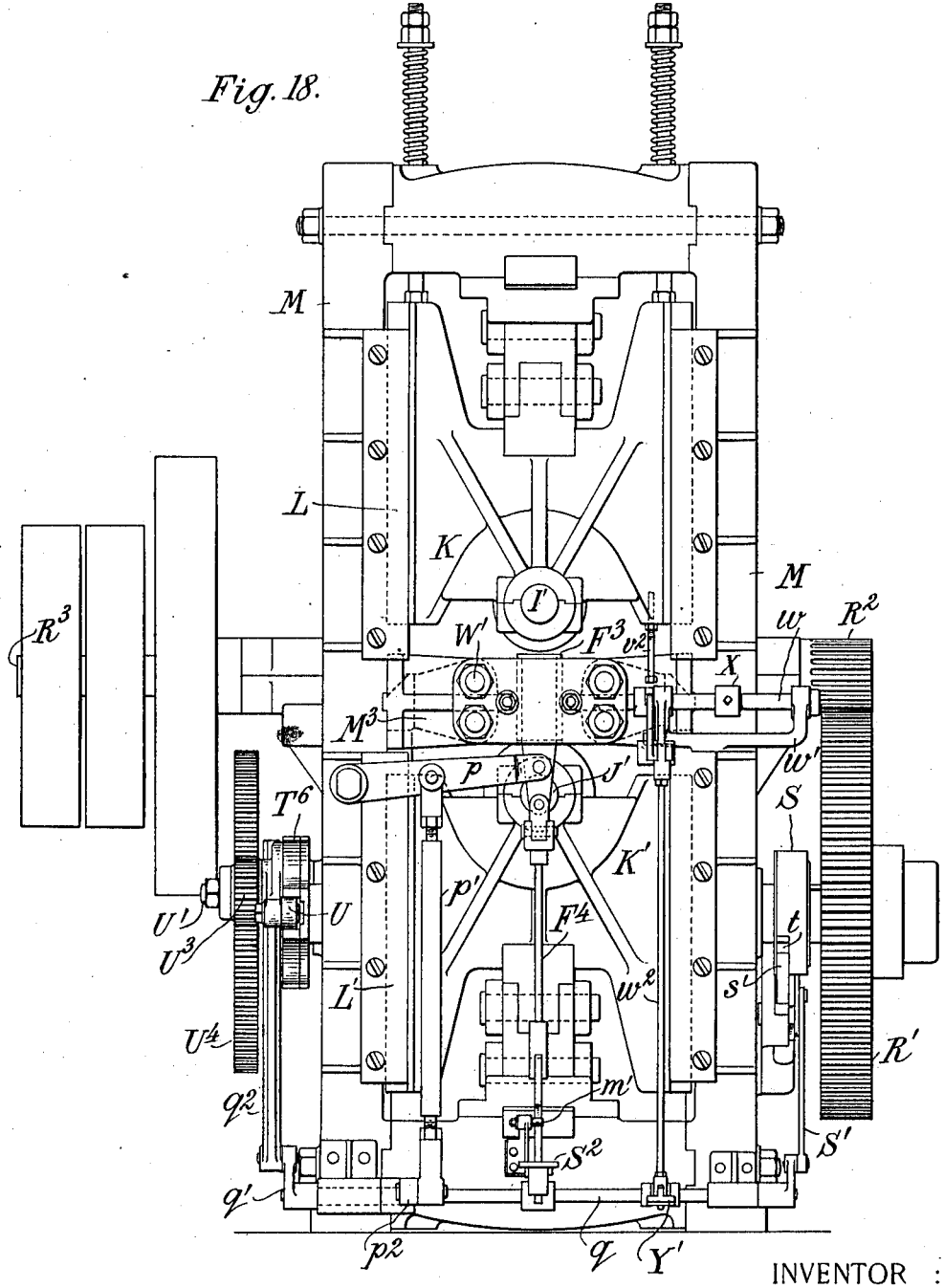

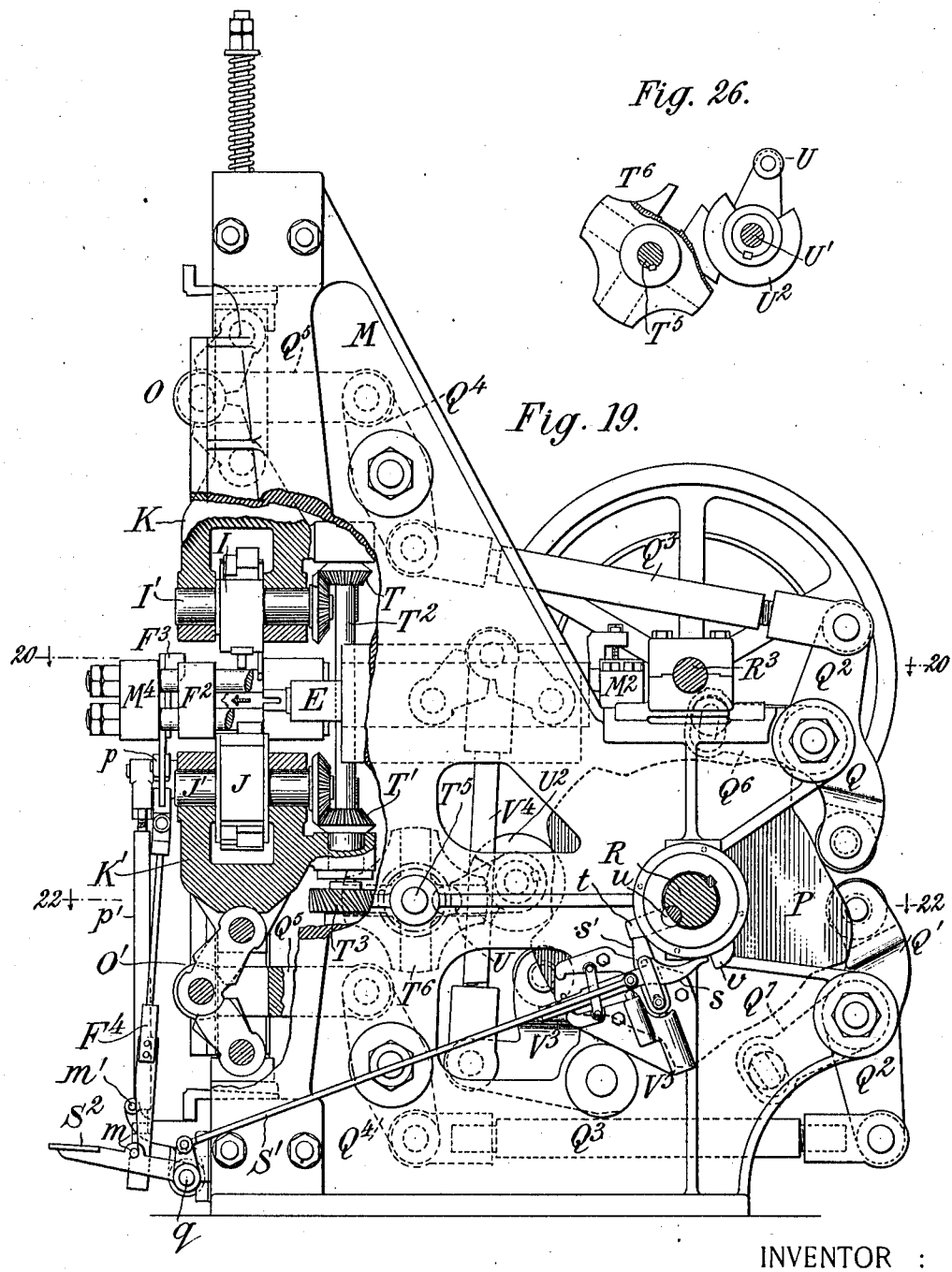

F. C. B. PAGE.
METAL WORKING MACHINE.
APPLICATION FILED APR. 6, 1910.

1,026,825.

Patented May 21, 1912.

8 SHEETS—SHEET 6.

WITNESSES:

INVENTOR:
Frank C. B. Page,
By Attorneys,

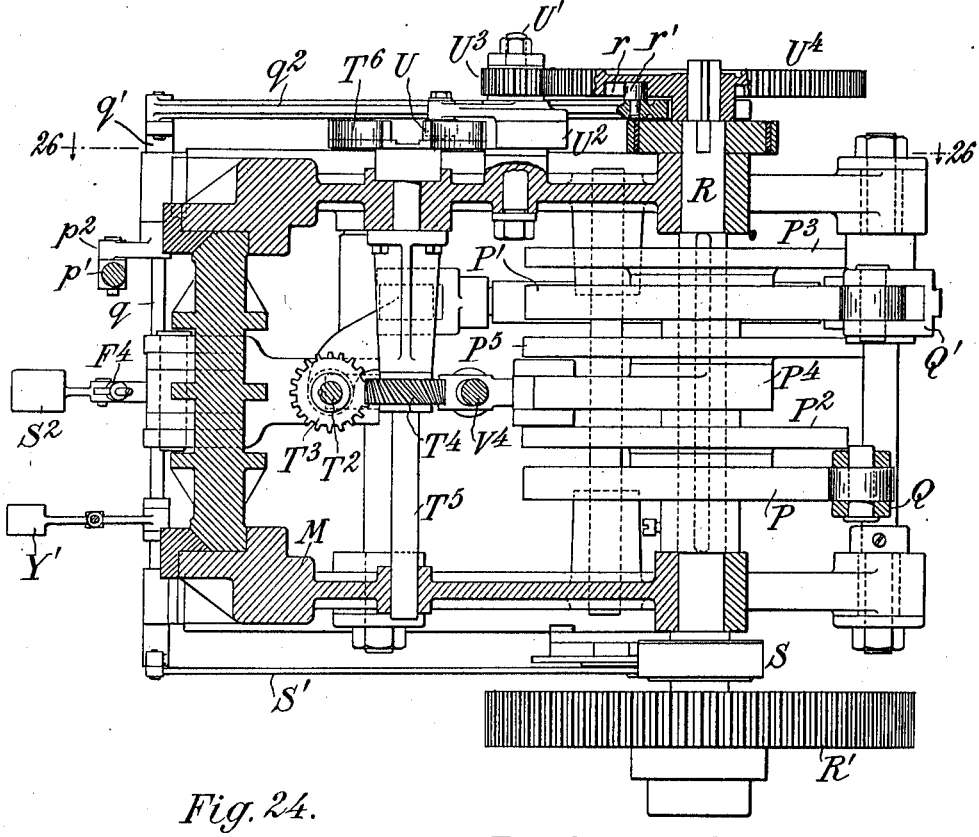
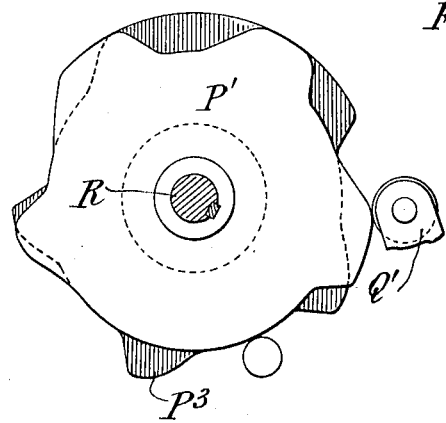
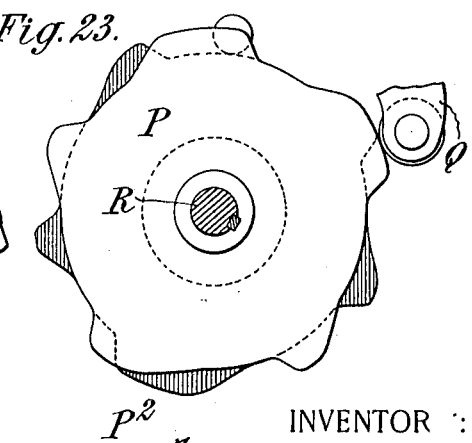

F. C. B. PAGE.
METAL WORKING MACHINE.
APPLICATION FILED APR. 6, 1910.
1,026,825.
Patented May 21, 1912.
8 SHEETS—SHEET 8.
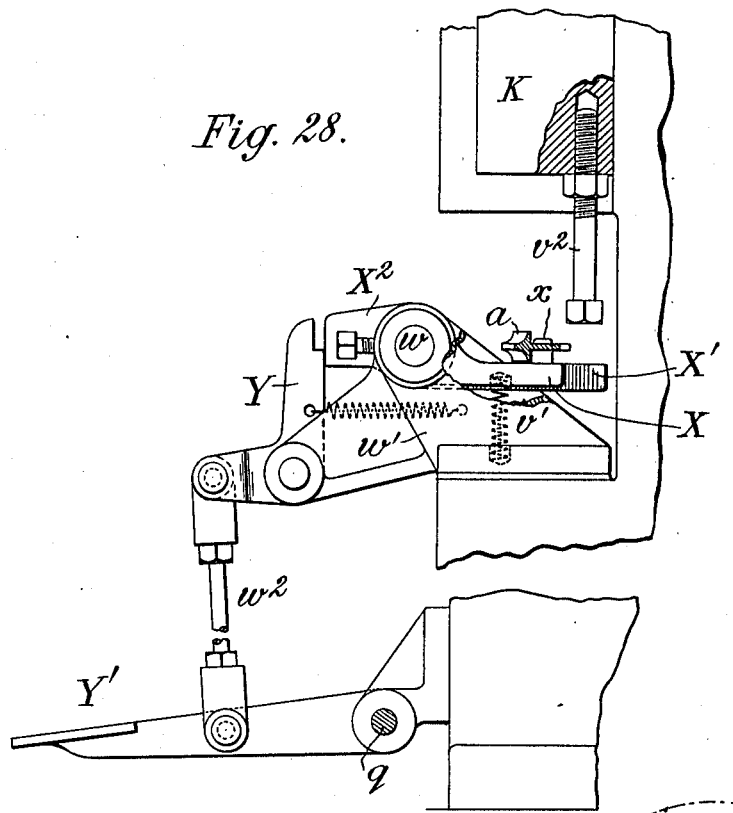
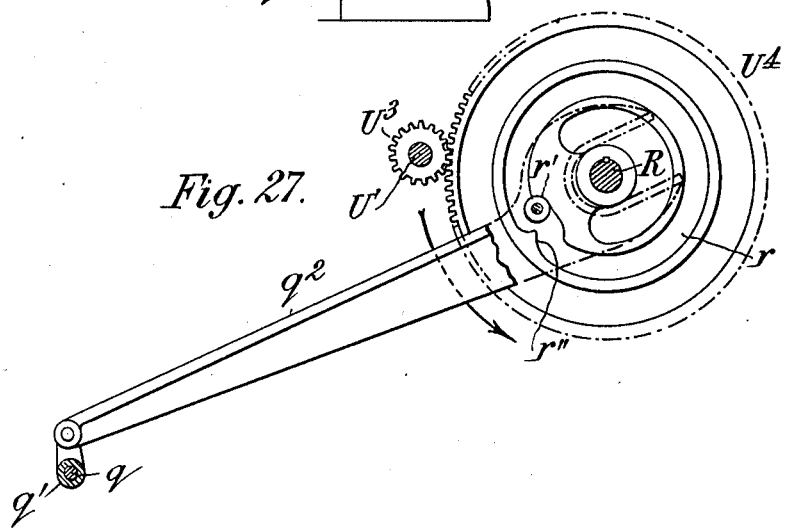
WITNESSES:
Fred White
René Bruine
INVENTOR :
Frank C. B. Page,
By Attorneys,

UNITED STATES PATENT OFFICE.

FRANK C. B. PAGE, OF NEW YORK, N. Y., ASSIGNOR TO E. W. BLISS COMPANY, OF BROOKLYN, NEW YORK, A CORPORATION OF WEST VIRGINIA.

METAL-WORKING MACHINE.

1,026,825.  Specification of Letters Patent.  Patented May 21, 1912.

Application filed April 6, 1910. Serial No. 553,837.

*To all whom it may concern:*

Be it known that I, FRANK C. B. PAGE, a citizen of the United States, residing in the borough of Brooklyn, county of Kings, city and State of New York, have invented certain new and useful Improvements in Metal-Working Machines, of which the following is a specification.

This invention provides a machine for cutting and shaping metal bars to facilitate the formation of a junction or crossing of one bar with respect to another.

Although otherwise applicable, the invention is particularly directed to forming the joints or crossings of fenestra bars, being those employed in metallic window sashes, or the like. The machine is however, with suitable modification, adapted for working the bars of doors, gratings, grilles and other analogous metallic structures.

In fenestra joints, where two window bars are crossed in the same plane, it is customary to form an opening through one bar capable of admitting the other or crossing bar, which is suitably notched, and after inserting the latter through the opening in the former to close this opening together so as to embrace the crossing bar and fill the notch therein. The present machine is especially adapted for performing the operations of punching, shearing and swaging the bar through which the other or crossing bar is passed.

Figure 8:
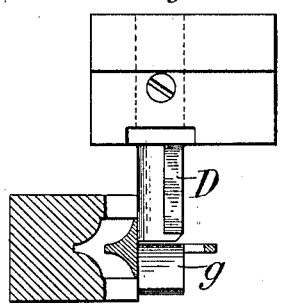
Figure 9:
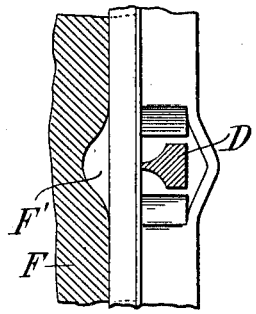
Figure 12:
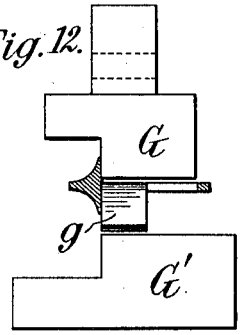
Figure 10:
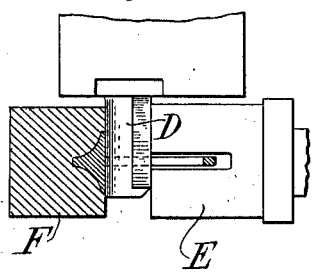
Figure 11:
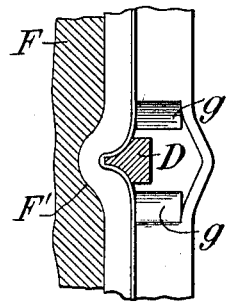
Figure 13:
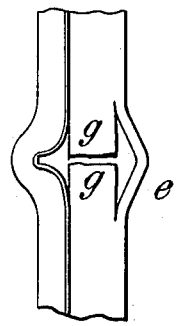
Figure 14:
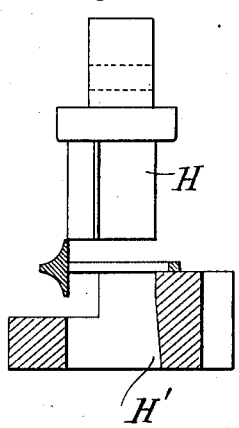
Figure 15:
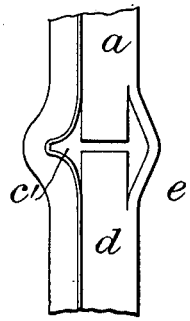
Figure 20:
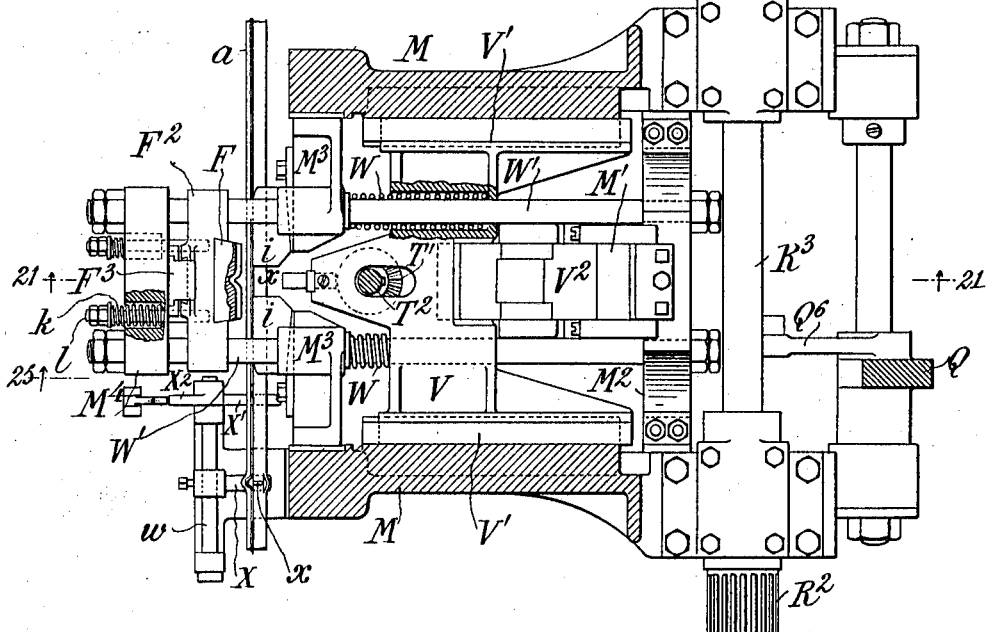
Figure 21:
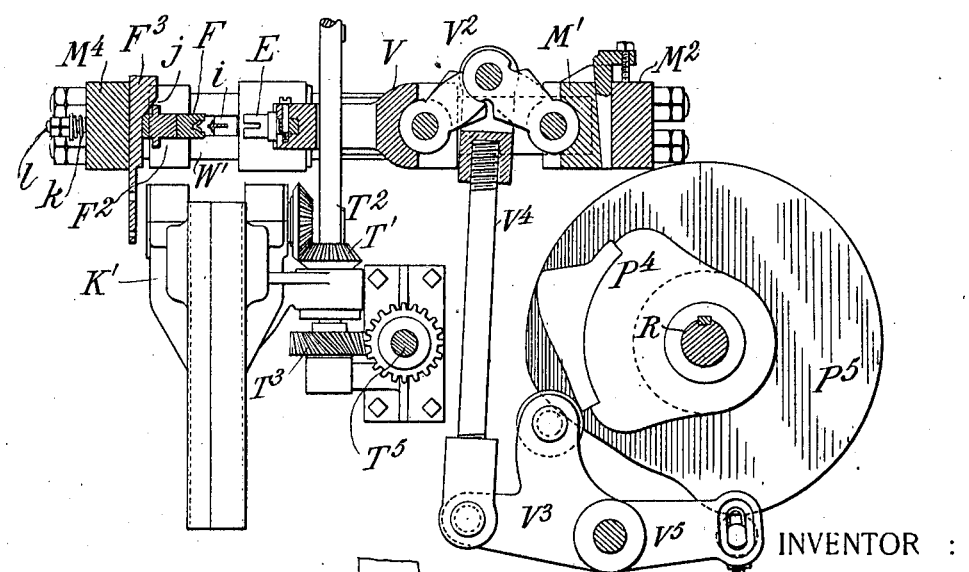
Figure 25:
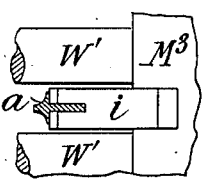

In the accompanying drawings Figure 1 is an elevation of a fenestra joint of which Fig. 2 is a transverse section. Fig. 3 is a sectional elevation of the punch and die which perform the first operation upon the bar. Fig. 4 is an elevation of the bar after the performing of this first punching operation. Figs. 5 and 6 are side and front elevations of the shearing punch and corresponding sections of the die therefor, for performing the second or shearing operation. Fig. 7 is an elevation of the bar after this operation has been performed. Fig. 8 is a sectional elevation of the tools or working parts for performing the third or crimping operation, showing the punch descending. Fig. 9 is a plan of the bar and a cross-section of the punch in the same position as Fig. 8. Fig. 10 shows the same parts as in Fig. 8, but displaced to the end of the working stroke. Fig. 11 is a plan of the bar and a cross-section of the punch in the same position as Fig. 10. Fig. 12 is a side elevation of the swaging dies or hammers which perform the fourth or flattening operation. Fig. 13 is a plan of the bar as it appears after this operation. Fig. 14 is a sectional elevation of the punch and die for performing the fifth or trimming operation. Fig. 15 is a plan of a bar after this operation. Fig. 16 is a front elevation of the turrets carrying the respective pairs of punches and dies for performing the five successive operations upon the bar, the latter being shown in position between them. Fig. 17 is a side elevation of the respective turrets and their tools. Fig. 18 is a front elevation of the machine constituting the preferred embodiment of this invention. Fig. 19 is a side elevation partly in vertical section. Fig. 20 is a horizontal section on the plane of the line 20—20 in Fig. 19, being a plane corresponding with that of the bar being operated upon. Fig. 21 is a fragmentary vertical section taken mainly on the plane of the line 21—21 in Fig. 20. Fig. 22 is a horizontal section on the plane of the line 22—22 in Fig. 19. Figs. 23 and 24 are elevations of two of the cams. Fig. 25 is a fragmentary horizontal section, being an enlargement of a portion of Fig. 19. Fig. 26 is a fragmentary section on the plane of the line 26—26 in Fig. 22, showing the Geneva stop movement which is indicated in dotted lines in Fig. 19. Fig. 27 is a fragmentary sectional elevation showing the parts on the opposite side of the machine from Fig. 19. Fig. 28 is a fragmentary elevation on a larger scale than the preceding figures showing especially the gage.

In Fig. 1 *a* and *b* are the two crossing bars of a fenestra joint. These bars consist each of a widened fan or head *c* and of a web *d*. The machine to be described is designed to operate upon the bar *a* to provide in it the opening through which the bar *b* is passed. The bar *a* after the requisite operations have been performed upon it, appears as shown in Fig. 15, its head having been crimped outwardly to form an opening *c'* for receiving the head of the crossing bar *b*, its web having been cut open to admit the web of the bar *b*, and the portion *e* of the web having been slitted and bent outwardly. The bar $b$ has a notch cut in its web at $f$ of a depth equal to the thickness of the portion $e$, and in sliding the bar $b$ through the opening in the bar $a$, this notch is brought into the plane of the web $d$ therein, whereupon the portion $e$ is swaged back to its original place and thereby forced into the notch so that it holds the bars against relative displacement. The joint thus completed is shown in Figs. 1 and 2.

The first operation upon the bar $a$ is performed by the tools shown in Fig. 3. In this figure A is a punch and A' is a die. The bar $a$ being in the position shown, the die supports it beneath, while the punch descends through it, thereby punching out a hole in its web as shown at $d'$ in Fig. 4. The instrumentalities by which the punch and die are thus caused to act upon the bar will be described later, it being sufficient here to state that the respective pairs of tools are first moved into coincidence with the work, and are then brought together to perform their operation upon the bar, are then separated, and are then moved away from the working point to make room for the next succeeding pair of tools to be brought to the working position.

The second operation is performed by the tools shown in Figs. 5 and 6, where B is a shearing punch and B' is the die therefor. The punch B has oblique sides, the edges or corners of which constitute the shearing edges of the punch, coöperating with an opening of equal width in the die. As the punch descends into the hole cut by the first operation, it makes shearing cuts extending longitudinally of the bar in both directions, the one cut being in the plane of the shoulder beneath the head of the bar, and the other being parallel therewith near the opposite edge of the web. The position of these cuts is shown by the dotted lines in Fig. 4. The metal between the cuts is thus separated to form ears. As the punch descends it forces these ears downwardly within the die and at the end of its stroke it squeezes or flattens these ears against the flaring walls of the die so that they lie in the positions shown in dotted lines in Fig. 6. The down-turned ears lettered $g$ are shown in Fig. 7. The principal object of this operation is to widen the opening formed by the first operation, in order thereby to make room for the crimping tool or hammer which performs the third operation. This second operation also results in separating the strip $e$ from the remainder of the web, but leaving it attached at its ends. This strip requires to be bent outwardly to the position shown in Fig. 7. This is logically a distinct operation, but practically it is most simply and easily performed during the stroke of the same punch B which performs the second or shearing operation. For this purpose this punch carries on one side a bending or wedging die C and the die B' has a recess C' into which the wedge C may enter as the punch descends to nearly the bottom of its stroke. The effect of the die C is to push or wedge the strip $e$ outwardly after it has been mainly severed from the adjoining web, and while it is supported upon the die B'. Fig. 7 shows the bar at the end of this operation. This bending-out of the strip $e$ not only brings it to its necessary position to admit the other bar $b$, but incidentally it has the advantage of enlarging the opening and thereby providing more room for the admission of the tool for performing the next operation.

The third operation is performed by the tools shown in Figs. 8 to 11. A swaging hammer D, Fig. 8, having the cross-section shown at D in Fig. 9, is first moved by its carrier downward through the hole or opening in the bar, as shown in Fig. 9. A ram or hammer E then advances from behind and pushes the hammer D bodily forward to the position shown in Fig. 10. In so doing it crimps the head of the bar, forcing it forwardly into a recess F', Fig. 8, in an anvil F. Thus the head of the bar is bent or swaged into the necessary shape to ride over or around the head of the crossing bar $b$ which is to be passed through it. To permit of this crimping motion the hammer D is mounted so as to be capable of movement in a transverse direction. Fig. 11 shows the bar in plan and the hammer and anvil in horizontal section, at the end of this crimping movement. Thereafter the ram E is retracted, the hammer D moves back to its initial position, and it is then lifted clear of the work, being then displaced to make room for the next pair of tools.

The fourth operation consists in flattening or swaging back the ears $g$ $g$, and is performed by means of the flattening dies or hammers shown in Fig. 12. These consist of an upper hammer G and a lower hammer G', both being flat upon their working faces. The hammer G, which constitutes the anvil, is first brought firmly against the upper side of the web, and the hammer G' is then forced upwardly, carrying up with it the ears $g$ $g$, which it flattens against the hammer G. These tools then separate, and are then moved out of the way for the next pair of tools. The bar at the end of this operation is shown in Fig. 13.

The fifth and final operation is that of cleanly punching out the opening, to remove all raw edges and irregularities, and is performed by means of the punching dies shown in Fig. 14. These consist of a punch H and a die H'. The punch H is conformed in cross-section exactly like the bar $b$, having a head and web, so that as this punch descends into the die it shears the margins of the opening, enlarging it only enough to make it true, and give its edges a suitable finish. The bar after the operation of this punch and die is shown in Fig. 15.

For performing these successive operations automatically in one machine it is preferable to mount the successive pairs of tools upon movable carriers, one for the upper and the other for the lower member of the tools, mounting these carriers so as to give them two movements, the one for bringing the tools to and carrying them from the working position, and the other for causing the tools to approach and recede from each other for performing their working functions. It is preferable to mount all of the upper members of the tools upon one carrier, and to mount all of the lower members upon a second carrier. These carriers are best constructed as turrets which revolve intermittently to displace the tools toward and from their working positions between the operative strokes, and which move bodily toward and from each other to cause the tools to perform their function.

The turrets are shown in Figs. 16 and 17, I being the upper turret and J the lower turret. These are rotatively mounted, being shown as formed with shafts or journals I′ and J′ respectively which may turn in suitable bearings. Means will be described for simultaneously revolving the two turrets one-fifth of a turn at each time. The upper turret carries the tools A, B, D, G and H. The lower turret carries the tools A′, B′ (a blank space corresponding in position to the upper tool D), G′ and H′. The turrets are shown with the punch A and die A′ in alinement and ready to be moved together to cause these tools to perform the first punching operation upon the bar. The turrets are then moved apart to retract the tools, and turned one-fifth of a revolution to bring the next pair of tools B and B′ into alinement, whereupon the approaching and receding movements are repeated, and so on, until the two turrets have executed a complete revolution. The bar is suitably clamped in position between them.

The entire machine is shown assembled in Figs. 18 and 19. The turrets I and J are carried respectively by upper and lower slides K and K′ which are formed with bearings for the journals I′ J′ of the respective turrets. The slides K K′ are movable in vertical slide-ways L L′ formed upon the main upright frames M M of the machine. For imparting the vertical or approaching and receding movements to the respective slides, they are shown as provided with toggles O and O′, the opposite ends of which are pivoted respectively to the frame and the slide, while the middle joint or knuckle is connected indirectly to an operating cam P or P′. The indirect connection shown is for each of the toggles comprised of a lever Q or Q′ carrying rollers which work against the cam faces and having an arm Q², an adjustable link Q³ connected to said arm at one end, a lever Q⁴ fulcrumed at its middle and pivoted at one end to said link, and a link Q⁵ connecting the opposite end of said lever to the knuckle joint of the toggle. The cam P for operating the upper slide engages the cam roller on the lever Q as shown in Fig. 19. A similar cam P′ for operating the lower slide engages the roller of the lever Q′. These cams P and P′ (which are shown in Figs. 23 and 24) impart the approaching movements to the respective slides, being the movements in which the cutting or swaging functions of the tools are performed. The opposite or receding movements of the slides might be performed by gravity or other force, or, by employing grooved cams, the same cams might perform the return movements; but because of the necessarily ponderous character of the slides and their attached parts it is preferable to employ separate cams for causing the slides to recede. These cams are lettered respectively P² and P³ in Fig. 22, and engage rollers carried by lever arms or tails Q⁶ and Q⁷ respectively, these rollers being preferably adjustably mounted as shown, so that wear may be taken up. The return cams P² P³ are shown in dotted lines in Figs. 23 and 24.

The several cams are all mounted upon a cam shaft R which is so driven as to execute one complete revolution at a time, corresponding to the complete series of operations necessary for forming one joint. The shaft R as shown in Fig. 22 carries a gear wheel R′ which is continuously driven from a pinion R² on a driving shaft R³, (Fig. 18) which is provided with fast and loose pulleys and a flywheel or any other means for continuously driving it. The gear R′ is mounted loosely upon the cam shaft R and is coupled thereto through the medium of a one-revolution clutch S of any well known construction, which is adapted, upon being engaged, to lock the shaft to the gear during one complete revolution, and thereupon to disconnect them, and thereby stop the cam shaft while permitting the gear wheel to continue rotating. This clutch is operated in a well known manner through a trip-rod S′ connected to a treadle S² so that when the operator depresses the treadle the rod is pulled and the clutch engaged to start the cam shaft.

For imparting the successive rotative movements to the two turrets simultaneously the following mechanism is provided. The journals I′ J′ of the turrets have fixed upon them miter gears (Fig. 19) which mesh respectively with miter gears upon a vertical axis. The upper pair of miters T is carried by the slide K, the lower pair of miters T' being carried by the slide K'. The slides have brackets which form bearings for the miters which are upon the vertical axis. Thus the miter gears move vertically with the slides. A vertical shaft $T^2$ passes through the hubs of the two miters whose axes are vertical, and has a spline or feather which engages grooves in their hubs, so that the gears may freely slide upon the shaft, but participate in any rotative movements of the shaft. The shaft $T^2$ is rotated intermittently by means preferably of what is known as a Geneva stop movement. In the construction shown the shaft $T^2$ has fixed to its lower end a worm wheel or skew-gear wheel $T^3$ which meshes with a worm or skew-gear wheel $T^4$ which is fixed on a transverse shaft $T^5$ which has fixed upon it the Geneva cross-wheel $T^6$. This wheel has, as usual, four radiating grooves or slots which are entered successively by a roller or stud U on a crank arm projecting from a shaft U', which shaft also carries the usual mutilated locking disk $U^2$, which engages the successive concave portions of the wheel $T^6$ to hold it stationary during the intervals between its successive movements. The crank stud and locking wheel are conveniently constructed in one part. The shaft U' is driven from the cam shaft at a speed as many times greater than that of the cam shaft as there are pairs of tools upon the turrets,—in the present instance being five times faster than the cam shaft. It is driven by a gear $U^4$ upon the cam shaft meshing with a pinion $U^3$ upon the shaft U'. At each revolution of the shaft U' the Geneva cross-wheel receives a quarter turn, which through the skew-gears is communicated to the shaft $T^2$ which is thus turned only one-fifth of a revolution, and through the pairs of miter wheels imparts the same partial rotation simultaneously to the two turrets. This partial rotation is accomplished while the slides are stationary in their fully retracted positions; during the advancing and retracting movements of the slides the miters slide idly up and down upon the shaft $T^2$ which is then stationary.

The horizontally moving ram E (Fig. 10) is carried upon a slide V, which as shown in Fig. 20, slides in ways V' V' formed on the side frames M M. For imparting the forward movement to this slide a pair of toggle links $V^2$ are provided, which as shown in Fig. 21 are seated at one extremity against an adjustable block M' which is reinforced against a cross-frame $M^2$, and at the other extremity against the slide V, while their middle joint or knuckle is connected through any suitable or intervening parts to an operating cam $P^4$. The connection shown consists of a lever $V^3$ fulcrumed between the main frames and having a roller engaging the cam $P^4$ (see Fig. 21), and connected through a link $V^4$ to the knuckle joint of the toggle. For retracting the slide a return cam $P^5$ is shown which engages a roller carried adjustably on an arm $V^5$ of the lever $V^3$. The slide V is also given a retractile tendency by applying springs which tend to thrust it backwardly. These springs W W are shown as coiled around rods W' which are arranged in pairs and pass through the machine from the rear cross-frame $M^2$ to the front. The slide V has recesses inclosing these springs and which are contracted at their rear ends to form shoulders against which the springs press rearwardly, as shown in Fig. 20.

The clamp by which the bar is held during the successive operations may be variously constructed, it being only essential that it shall be capable of opening at the end of the series of operations, to permit the bar to be fed along into position for performing the next series of operations for the next joint; that it shall securely clamp and hold the bar during the movements of the successive tools, and that it shall serve as a die or anvil for coöperating with the ram E in performing the swaging operation shown in Fig. 11. In the construction shown the machine is provided with front frames $M^3$, which are fastened to the side frames M and project toward each other nearly to the middle, but sufficiently far apart to leave between them a gap at $x$, Fig. 20, through which the successive tools may act. These frames $M^3$ have openings through which pass the rods W'. They also are formed with jaw portions $i\ i$ which are extended forward and are grooved to receive the web $d$ of the bar, as shown in Fig. 25. The jaws $i\ i$ form collectively the fixed jaw of the clamp. The movable jaw thereof is formed by the anvil F, which has a groove conforming to the head of the bar, and which is a block carried in a sliding cross-head $F^2$ which is mounted to slide upon the bars W', and when slid rearwardly thereon grips the bar $a$ against the jaws $i\ i$. The front ends of the rods W' are engaged by a fixed cross-head $M^4$ which forms an abutment for the cross-head $F^2$. For operating the clamp a vertically moving slide $F^3$ is provided, which moves in vertical ways on the cross-head $M^4$ and which is formed on its rear face with an inclined or wedge surface $j$, which as the slide is drawn down, engages the front of the slide $F^2$ and pushes it rearwardly. The return movement of the slide $F^2$ when the slide $F^3$ is elevated again is performed by springs $k$, which are shown as helical springs encircling rods $l$ which are attached to the slide $F^2$ and pass through recesses in the cross-head $M^4$, which recesses are contracted at their rear ends to form shoulders against which the springs react (see Fig. 20).

The clamp-operating slide F³ is operated from the treadle S² through any suitable connection; or it may be operated from some other part of the machine. That which is essential or practically important is, that when the treadle S² is depressed to start the machine, the clamp shall be closed upon the bar $a$, and the latter shall be held firmly by the clamp during the entire cycle of operations, until at the completion of one revolution of the cam shaft the clamp shall be opened to release the bar and enable it to be fed along into position for forming the next joint. Preferably the bar is first lightly clamped by the pressing down of the treadle to start the machine, so that the bar cannot become displaced; the starting of the machine then results in the clamp being automatically tightened to firmly grasp and hold the bar; and it continues thus closed upon the bar until the stoppage of the machine, being automatically thrown open just before the machine comes to rest. For performing these operations the following described mechanism is provided. The clamping wedge F³ is connected to a rod F⁴ which extends downward and initially engages the treadle S², being formed near its lower end with a hook or shoulder which is engaged by a pin $m$ on the treadle lever (see Fig. 19). A fixed pin $m'$ carried on a bracket, comes against the front edge of the rod F⁴, so that it prevents the rod moving forward. The treadle is fixed on a shaft $q$, the axis of which is considerably below the pin $m$, so that as the treadle is pressed down the pin $m$ moving in an arc around this axis, swings forward, and since the hooked end of the rod F⁴ cannot move forward with it, the pin after pulling down the rod a certain distance slips off its shoulder or hook and thus disengages the treadle from the rod. The downward movement thus imparted through the rod F⁴ to the wedge F³, is sufficient to close the clamp upon the bar $a$ tightly enough to hold this bar from slipping. The gear wheel U⁴ fixed on the cam shaft R has upon its inner face a cam-groove $r$ (Fig. 27) which engages a pin or roller $r'$ carried on a rod $q^2$ (Figs. 27, 22 and 18), which rod connects with a crank arm on one end of a shaft $q'$ (shown as tubular and inclosing the shaft $q$), and which on its opposite end has a crank arm $p^2$ (Fig. 22) which connects through a rod $p'$ and lever $p$ (Fig. 18) with the clamping wedge or slide F³. Thus the cam $r$ through the interposed mechanism operates the slide F³. Fig. 27 shows the parts in the position of rest. The depressing of the treadle first pulls down the slide F³ as described, and this through the intermediate mechanism $p$, $p'$, $p^2$, $q'$, $q^2$, moves the roller $r'$ out of the notch in which it rests in Fig. 27, and nearly into the main cam-groove; upon the starting of the machine at the same instant, the cam forces the roller fully into this groove, and thereby completes the clamping movement of the slide F³; the concentric portion of the groove $r$ holds the slide F³ down and the clamp closed until just before the completion of the revolution, whereupon the cam projection $r''$ encounters the roller $r'$ and pushes it rearwardly, so that through the intervening mechanism it thrusts up the slide F³ and opens the clamp, which occurs just before the cam shaft comes to rest.

The one-revolution clutch is not shown in detail, such clutches being well understood and forming in themselves no novel element of my invention. The well known Bliss clutch may be used for this purpose, or any other form of one-revolution clutch such as is commonly used for power punching presses. A portion of the Bliss clutch is shown in Fig. 19. With this construction of clutch the pressing down of the treadle S² pulls the rod S⁷ which is connected to a hook or latch $s$, the pulling of which by the rod moves a pivoted dog $s'$ against which rests a clutch arm $t$ projecting from the usual clutch key $u$ seated in the cam shaft R. The clutch shown is of the character illustrated in U. S. Patent No. 568,575 dated September 29, 1896. The cam shaft R carries a cam projection $v$ which toward the end of its revolution strikes the hook $s$ and pushes it down far enough to unhook it from the dog $s'$, in order that if the treadle has not been released the hook can no longer hold the dog $s'$ out of the path of the arm $t$, so that the dog is pressed back by its spring (not shown) to the position shown, where it stands in the path of the arm $t$, and upon being struck thereby throws it back, uncouples the clutch, and stops the cam shaft. Thus the stoppage of the shaft at the end of one revolution is assured. The mechanism thus described and partially shown in the drawings, is the well known construction of Bliss one-revolution clutch.

It is desirable to provide the machine with a gage to insure the accurate spacing of the fenestra joints to be formed along the bar. A suitable gage is shown on an enlarged scale in Fig. 28. A shaft $w$ is arranged parallel with the bar $a$ to be operated on, being hung in suitable bearings in a bracket $w'$ fastened to the main frame. On this shaft is fastened adjustably a gage arm X which projects rearwardly and is adapted to engage the bar $a$ in any suitable way, preferably by having a spur $r$ adapted to project up into the slot $d'$ formed in the web of the bar in performing the last previous operation. By adjusting this gage arm along the shaft $w$, the distance between the fenestra joints may be varied at will. The gage thus provided may be variously operated. In the preferred construction shown a non-adjustable arm $X'$ is fixed upon the shaft $w$ and is pressed upwardly by a spring $v'$, which thus holds the gage arm X in engagement with the bar until the machine starts, whereupon on the first downward movement of the slide K an adjustable screw pin $v^2$ carried thereby strikes the arm $X'$ and pushes it down, thereby depressing the arm X so as to disengage the bar, which is now firmly held by the clamp. Preferably the gage when thus depressed should be held down against the stress of the spring $v'$, and for this purpose a catch lever Y is provided having a shoulder adapted to take under a forwardly projecting arm $X^2$ fixed to the shaft $w$, and which is preferably integral with the arm $X'$. The catch lever Y is pressed up by a spring and may be released by a handle, or preferably by being connected through a rod $w^2$ with a special treadle $Y'$. After completing each joint the operator slides the bar $a$ along toward the right until the joint last made comes over the spur $x$, whereupon by pressing the treadle $Y'$ the gage is released and springs up into engagement with the bar so as to hold it until it has been again clamped for the forming of the next joint.

The machine provided by the present invention may be considerably varied without departing from its essential features which are hereinbefore described. The invention is therefore not necessarily limited to the details of construction set forth.

I claim as my invention:—

1. A machine of the class described, including in combination means for holding the work, means for punching a hole through the web, means for slitting the web, and for bending down a portion thereof adjoining said hole, means for bending outwardly the slitted portion of the web adjacent to said hole, means adapted to enter said hole and move laterally therein to bend outwardly the head, means for bending back the bent-down portion of the web, mechanism for operating said means successively, adapted when started to perform one series of operations.

2. A machine of the class described, including in combination means for holding the work, means for punching a hole through the web, a shearing and bending punch for simultaneously slitting and bending down the web adjoining said hole, means adapted to enter said hole to bend outwardly the head, means for bending back the bent-down portion of the web, and mechanism for operating said means successively, adapted when started to perform one series of operations.

3. A machine of the class described, including in combination a clamp for holding the work stationary, means for punching a hole through the web, means for slitting the web and for bending outwardly the slitted portion thereof adjacent to said hole, means for bending outwardly the head adjacent to said hole, and automatic mechanism for bringing said means successively to the same point and for operating them to perform said operations upon the work adapted when started to perform one series of operations.

4. A machine of the class described, including in combination a clamp for holding the work stationary, means for punching a hole through the web, means for slitting the web and bending down portions thereof adjoining said hole, means for bending outwardly the slitted portion of the web adjacent to said hole, means adapted to enter said hole to bend outwardly the head, means for bending back said bent-down portions to flatten the web, and mechanism for bringing said means successively to the same point and for operating them to perform said operations upon the work adapted when started to perform one series of operations.

5. A machine of the class described, including in combination a clamp for holding the work stationary, means for punching a hole through the web, means for slitting the web and for bending outwardly the slitted portion adjacent to said hole, means for bending outwardly the head adjacent to said hole, a finishing punch for trimming the hole, and mechanism for bringing said means successively to the same point to perform said operations upon the work adapted when started to perform one cycle of operations.

6. A machine of the class described, including in combination a clamp for holding the work, successive means for punching and bending the work, means for operating said successive means adapted when started to perform one cycle of operations, and controlling means adapted when operated to close said clamp upon the work and start said operating means.

7. A machine of the class described, including in combination a clamp for holding the work, successive means for punching and bending the work, means for operating said successive means adapted when started to perform one cycle of operations, and comprising a cam shaft and cams adapted to impart the requisite movements during one complete revolution, a source of power, a one-revolution clutch adapted to couple said cam shaft to the power source during one revolution, and controlling means adapted when operated to close said clamp upon the work and to apply said clutch.

8. A machine of the class described, including in combination a clamp for holding the work, successive means for punching and bending the work, means for operating said successive means comprising a cam shaft and cams adapted to impart the requisite movements to perform one cycle of operations during one complete revolution of the cams, a driving means adapted to revolve said cam shaft through one revolution and thereupon to disconnect itself therefrom, and controlling means adapted when operated to start said driving means and to close the clamp upon the work.

9. A machine of the class described, including in combination a clamp for holding the work, successive means for punching and bending the work, means for operating said successive means adapted when started to perform one cycle of operations, and means adapted upon the termination of said operations to open the clamp and release the work.

10. In a machine of the class described, the combination of a clamp for holding the work, and successive means for punching and bending the work, comprising a combined slitting and bending punch, and a die coacting therewith, adapted to simultaneously slit a web and bend down ears therefrom.

11. In a machine of the class described, the combination of a clamp for holding the work, and successive means for punching and bending the work, comprising a slitting and bending punch having a laterally inclined projection, and a die coacting therewith, having a recess corresponding to said projection, adapted to simultaneously slit a web, bend down ears therefrom, and bend outwardly the slitted portion thereof.

12. In a machine of the class described, the combination of a clamp for holding the work, and successive means for punching and bending the work, comprising a swaging hammer adapted to advance through the web and thereupon to move laterally, and a ram movable to force said hammer laterally against the work.

13. In a machine of the class described, the combination of a clamp for holding the work, and successive means for punching and bending the work, comprising a stationary anvil for supporting the work, a swaging hammer adapted to move into engagement with the work opposite said anvil, and means for moving said hammer laterally to crimp the work against said anvil.

14. A machine of the class described, including in combination means for holding the work, pairs of coacting tools successively engaging the work from opposite sides, a pair of rotatable turrets carrying such tools, reciprocating slides carrying said turrets, a shaft arranged parallel to the movement of said slides, two pairs of bevel gears connecting the respective turrets to said shaft, the gears upon said shaft being splined thereto to slide thereon during the movement of said slides, and operating mechanism for alternately imparting back and forth movements to said slides, and rotative movements to said shaft for advancing the turrets.

15. In a machine of the class described, the combination with coacting tools engaging the work from opposite sides, of holding means for the work comprising fixed jaws for receiving one side of the work, and a movable jaw for engaging the opposite side of the work, said jaws having a gap or opening to permit access of tools to and through the work, and operating means for opening and closing said holding means.

16. In a machine of the class described, the combination with coacting tools engaging the work from opposite sides, of a clamp for the work comprising a fixed jaw engaging the work on one side, and a movable jaw engaging it on the opposite side, and operating means comprising a reciprocating part having a wedging face for forcing said movable jaw against the work.

17. In a machine of the class described, a clamp for the work comprising fixed and movable jaws engaging the work on opposite sides, said movable jaw formed with a recess into which to crimp the work, operating means for forcing said movable jaw against the work and holding it fast, and means for crimping the work into said recess.

18. In a machine of the class described, a clamp for the work comprising a fixed jaw engaging the work on one side, a movable jaw engaging it on the opposite side, a fixed cross-head, springs pressing said movable jaw away from the fixed jaw, and a movable part between said movable jaw and cross-head having a wedging face for forcing the movable jaw against the work.

19. A machine of the class described, including in combination a pair of turrets arranged to reciprocate vertically toward and from each other, a vertical shaft for rotating said turrets, and a Geneva movement for turning said shaft intermittently.

20. A machine of the class described, including in combination a pair of turrets arranged to reciprocate vertically toward and from each other, a vertical shaft geared to said turrets, a Geneva movement for turning said shaft intermittently, mechanism for reciprocating said turrets, and a shaft driving said reciprocating mechanism and said Geneva movement.

21. A machine of the class described, including in combination a clamp for holding the work, successive means for punching and bending the work, means for operating said successive means adapted when started to perform one cycle of operations, a starting lever connected to said clamp to close it upon the work, and means adapted upon the termination of said operations to open the clamp and release the work.

22. A machine of the class described, including in combination a clamp for holding the work, successive means for punching and bending the work, means for operating said successive means adapted when started to perform one cycle of operations, controlling means adapted when operated to start said operating means, and to close the clamp, and adapted upon the termination of said operations to stop said operating means and open said clamp.

23. A machine of the class described, including in combination a clamp for holding the work, successive means for punching and bending the work, means for operating said successive means comprising a cam shaft and cams adapted to impart the requisite movements to perform one cycle of operations during one complete revolution of the cams, and including a cam for first closing said clamp and finally opening said clamp, and a driving means adapted to revolve said cam shaft through one revolution and thereupon to disconnect itself therefrom.

24. A machine of the class described, including in combination a clamp for holding the work, successive means for punching and bending the work, means for operating said successive means comprising a cam shaft and cams adapted to impart the requisite movements to perform one cycle of operations during one complete revolution of the cams, and including a cam for opening said clamp, a driving means adapted to revolve said cam shaft through one revolution and thereupon to disconnect itself therefrom, and a starting treadle connected to said clamp to close the same, and to said driving means, whereby the clamp is closed by the treadle and opened by said cam.

25. A machine of the class described, including in combination a clamp for holding the work, a movable part for closing said clamp, successive means for punching and bending the work, a cam shaft and cams adapted to impart the requisite movements thereto, a one-revolution clutch for operating said cam shaft, and a starting treadle connected to said clutch to start the machine and connected also to said clamp-closing part so that the starting movement of the treadle closes the clamp upon the work.

26. A machine of the class described, including in combination a clamp for holding the work, a movable part for closing said clamp, successive means for punching and bending the work, a cam shaft and cams adapted to impart the requisite movements thereto, a one-revolution clutch for operating said cam shaft, a starting treadle connected to said clutch to start the machine, and a trip connection between said treadle and clamp-closing part adapted during the starting movement of the treadle to first close said clamp upon the work and then disconnect the treadle therefrom.

27. In a machine of the class described, the combination of a clamp for holding the work and successive means for punching and bending the work, with a gage having a projection adapted to enter a punched opening in the work, and adjustable in the direction of the travel of the work, and means for displacing said gage to withdraw said projection from the work to permit the latter to be advanced.

28. In a machine of the class described, the combination of a clamp for holding the work and successive means for punching and bending the work, with a gage having a projection adapted to enter a punched opening in the work comprising a shaft extended parallel with the travel of the work and a gage arm adjustable thereon, and means for disengaging said gage from the work.

29. In a machine of the class described, the combination of a clamp for holding the work and successive means for punching and bending the work, with a gage having a projection adapted to enter a punched opening in the work comprising a shaft extended parallel with the travel of the work and a gage arm adjustable thereon, and means for disengaging said gage from the work comprising an arm fixed on said shaft and arranged to be displaced by a moving part of the machine.

30. In a machine of the class described, the combination of a clamp for holding the work and successive means for punching and bending the work, with a gage having a projection adapted to enter a punched opening in the work comprising a shaft extended parallel with the travel of the work and a gage arm adjustable thereon, and means for disengaging said gage from the work comprising an arm fixed on said shaft, and a gage adapted to engage said arm when the gage is displaced from the work and to hold it so displaced.

In witness whereof, I have hereunto signed my name in the presence of two subscribing witnesses.

FRANK C. B. PAGE.

Witnesses:
H. C. SEAMAN,
JOHN D. McINTYRE.

---

Copies of this patent may be obtained for five cents each, by addressing the "Commissioner of Patents, Washington, D. C."